(12) United States Patent
Huang et al.

(10) Patent No.: US 7,186,027 B2
(45) Date of Patent: Mar. 6, 2007

(54) FAN MOTOR WITH FLUID DYNAMIC BEARING

(75) Inventors: Ching-Hsing Huang, Tu-Cheng (TW); Chien-Long Hong, Tu-Cheng (TW); Wun-Chang Shih, Tu-Cheng (TW); Hsien-Sheng Pei, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 105 days.

(21) Appl. No.: 11/012,421

(22) Filed: Dec. 14, 2004

(65) Prior Publication Data

US 2006/0126976 A1 Jun. 15, 2006

(51) Int. Cl.
*F16C 17/10* (2006.01)
(52) U.S. Cl. ....................................................... 384/114
(58) Field of Classification Search ................ 384/115, 384/114, 119, 113, 107
See application file for complete search history.

(56) References Cited

U.S. PATENT DOCUMENTS 6,236,129 B1 5/2001 Yamashita
7,056,026 B2 * 6/2006 Grantz et al. ................ 384/119

* cited by examiner

*Primary Examiner*—Lenard A. Footland
(74) *Attorney, Agent, or Firm*—Morris Manning & Martin LLP; Tim Tingkang Xia, Esq.

(57) ABSTRACT

A fan motor includes an integral bearing member (40') defining therein an axial inner bearing hole (21') and forming a ventilating path (25') in a wall portion thereof to communicate a bottom of the bearing hole with an exterior of the bearing member, a stator assembly (50) mounted to an outer periphery of the bearing member, and a rotor assembly (60) comprising a rotary shaft (68) extending into the bearing hole and a permanent magnet (66) confronting the stator assembly. Lubricating oil is filled between the rotary shaft and bearing member to establish dynamic pressure to separate the rotary shaft and the bearing member in radial direction when the rotary shaft rotates.

13 Claims, 3 Drawing Sheets

FAN MOTOR WITH FLUID DYNAMIC BEARING

CROSS-REFERENCE TO RELATED APPLICATIONS

This application is related to U.S. patent applications Ser. No. 11/012,420, entitled "FLUID DYNAMIC BEARING" and U.S. patent application Ser. No. 11/012,419, entitled "FLUID DYNAMIC BEARING UNIT", both of which are filed with the same assignee as the instant application on Dec. 14, 2004. The disclosure of the above-identified applications is incorporated herein by reference.

TECHNICAL FIELD

The present invention relates generally to motors, and more particularly to a fan motor having a fluid dynamic bearing.

BACKGROUND

Due to request for low abrasion on rotational elements to achieve an extended life and for low extent of noise, fluid dynamic bearings (FDB) have been used in conventional fan motors.

FIG. 6 depicts a fan motor using an FDB unit. The motor comprises a shaft 80 extending through a bearing sleeve 81 with a clearance space formed therebetween. The clearance space is filled with lubricant oil that provides a medium through which a dynamic fluid pressure field may be generated. Relative rotation between the bearing sleeve 81 and the shaft 80 is required to set up the dynamic fluid pressure field. The bearing sleeve 81 supports radial load by metal-to-metal contact when there is no relative motion. During normal operation, the spinning of the shaft 80 sets up a steady pressure field around the clearance space that pushes the shaft 80 and the bearing sleeve 81 apart and thus prevents metal-to-metal contact. To obtain an improved dynamic pressure field, grooves 82 are formed on the inner surface of the bearing sleeve 81.

The bearing sleeve 81 is disposed in a housing 83. A ventilating passage 85 is formed between the outer periphery of the bearing sleeve 81 and an inner surface of the housing 83. The ventilating passage 85 has a vertical section and a horizontal section. This ventilating passage 85 allows air to escape the bearing sleeve 81 when the shaft 80 enters the bearing sleeve 81. However, the fluid dynamic bearing system is cooperatively formed by two components, i.e., the housing 83 and the bearing sleeve 81. To ensure the dynamic fluid pressure, the two components must be precisely produced and then assembled together. This structure is complicated and necessitates a high manufacturing cost.

For the foregoing reasons, there is a need for a fluid bearing having a simple structure with low cost.

SUMMARY OF THE INVENTION

The present invention is directed to a fan motor having a fluid dynamic bearing which has a simple structure.

A fan motor according to the present invention comprises an integral bearing member defining therein an axial inner bearing hole and forming a ventilating path in a wall portion thereof to communicate a bottom of the bearing hole with an exterior of the bearing member, a stator assembly mounted to an outer periphery of the bearing member, and a rotor assembly comprising a rotary shaft extending into the bearing hole and a permanent magnet confronting the stator assembly. Lubricating oil is filled between the bearing member and the rotary shaft to establish dynamic pressure to separate the rotary shaft and the bearing member in radial direction when the rotary shaft rotates.

Other objects, advantages and novel features of the present invention will be drawn from the following detailed description of the preferred embodiments of the present invention with attached drawings, in which:

DESCRIPTION OF PREFERRED EMBODIMENTS

Figure 1:
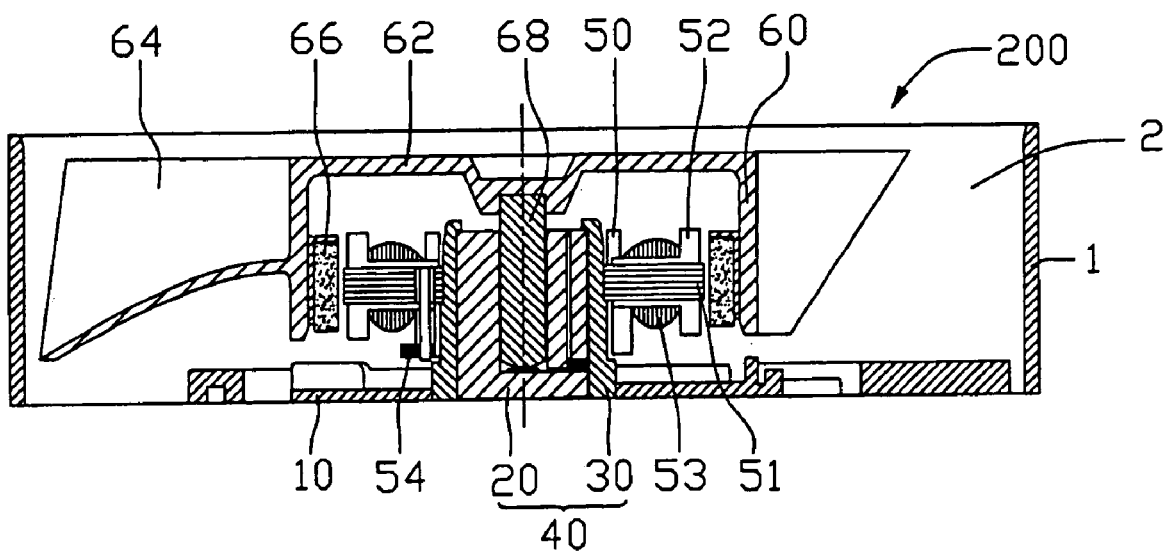
FIG. 1 is a cross sectional view of a fan according to a preferred embodiment of the present invention.

Referring to FIG. 1, a fan 200 according to a preferred embodiment of the present invention comprises a fan frame 1 defining an inner cavity 2, and a motor received in the inner cavity and comprising a support member 40 arranged in a middle of the inner cavity 2, a stator assembly 50 mounted around the support member 40, and a rotor assembly 60 pivotably supported by the support member 40.

The fan frame 1 is made of plastic material, and comprises a base 10 for supporting other parts of the fan 200. The support member 40 is positioned at a middle of the base 10. The support member 40 comprises an axial tube 30 mounted to the base 10 and a bearing housing 20 mounted in the axial tube 30. The support member 40 will be described more detail hereinafter.

The stator assembly 50 is mounted to an outer periphery of the axial tube 30. The stator assembly 50 comprises a plurality of laminated silicon plates 51. A pair of insulating frames 52 is mounted on top and bottom sides of the silicon plates 51. Stator coils 53 are wound around the silicon plates 51 and are spaced from the silicon plates 51 by the insulating frames 52. The lead wires of the stator coils 53 are electrically connected to an electrical circuit formed on a circuit board 54.

The rotor assembly 60 comprises a hub 62 covering the stator assembly 50. A plurality of fan blades 64 extends outwardly and radially from an outer circumferential periphery of the hub 62. An annular permanent magnet 66 is attached to an inner circumferential periphery of the hub 62. The permanent magnet 66 confronts the silicon plates 51 and stator coils 53 of the stator assembly 50. A rotary shaft 68 extends perpendicularly and downwardly from a top wall of the hub 62. The rotary shaft 68 extends into and is pivotably supported by the bearing housing 20.

Figure 2:
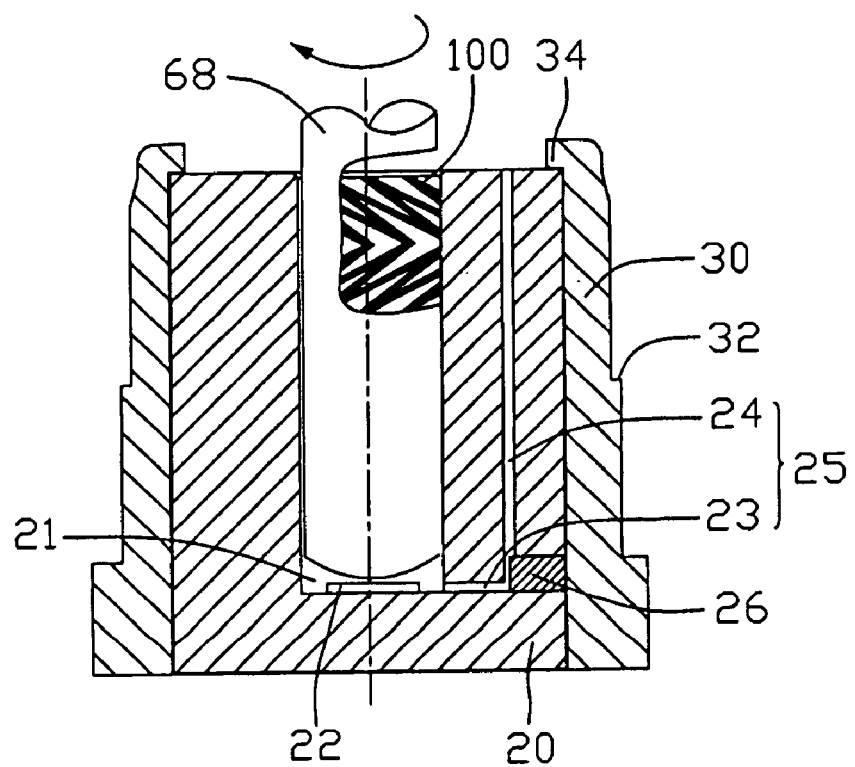
FIG. 2 is an enlarged cross section depicting the support member of the fan of FIG. 1.

Referring to FIG. 2, the axial tube 30 is made of metal material such as copper alloy. The axial tube 30 is secured to the base 10 of the fan frame 1 by injection molding. The outer diameter of an upper section of the axial tube 30 is less than that of a lower section of the axial tube 30, so that a step 32 is formed at the outer periphery of the axial tube 30. The step 32 is used for assisting axially positioning the stator assembly 50 on the axial tube 30, as shown in FIG. 1. An annular inner flange 34 is formed on the top edge of the axial tube 30. The inner flange 34 engages with a top face of the bearing housing 20.

The bearing housing 20 has a generally U-shaped cross section and is secured in the axial tube 30 by means of press-fitting. During assembly, the bearing housing 20 is pressed into the axial tube 30 from a bottom of the axial tube 30. A bearing hole 21 is defined in the bearing housing 20 for receiving the rotary shaft 68 therein. The bearing hole 21 is a blind hole so that the bearing hole 21 does not extend through the bearing housing 20. Thus, the bearing housing 20 is open at the top side thereof while closed at the bottom side thereof. A thrust plate 22 is disposed at a bottom of the bearing housing 20 to axially support the rotary shaft 68. The thrust plate 22 is made of resin material and has a high resistance against abrasion. Lubricating oil is contained in a space between the bearing housing 20 and the rotary shaft 68.

A ventilating path 25 is formed in the wall of the bearing housing 20. The ventilating path 25 communicates a bottom of the bearing hole 21 with an exterior of the bearing housing 20. For facilitating manufacturing of the ventilating path 25, the ventilating path 25 includes a first section 23 horizontally and radially defined through the wall of the bearing housing 20 and a second section 24 vertically defined in the wall to communicate the first section 23 with an exterior of the bearing housing 20 at the top face thereof. The first section 23 has an inner end communicating with the bearing hole 21 at a bottommost portion thereof and an outer end communicating with an exterior of the bearing housing 20 at a circumferential periphery thereof. The first section 23 near the outer end thereof is enlarged in diameter. A plug 26 is disposed in the enlarged section prior to mounting the bearing housing 20 to the axial tube 30 to obstruct the first section 23 from continuingly communicating with the exterior of the bearing housing 20 via the outer end thereof and thus allow the first section 23 to only communicate with the exterior of the bearing housing 20 via the second section 24. When the rotary shaft 68 extends into the bearing housing 20, air in the bearing hole 21 is able to escape along the first section 23 and then the second section 24 to the exterior of the bearing housing 20.

A cylindrical bearing pattern 100 is formed on an inner cylindrical surface of the bearing housing 20. Alternatively, the bearing pattern 100 is formed on the outer surface of the rotary shaft 68. The bearing pattern 100 is filled with lubricating oil. When the rotary shaft 68 rotates at a high speed in the bearing housing 20, the lubricating oil in the bearing pattern 100 establishes dynamic pressures against the rotary shaft 68 so that the rotary shaft 68 does not physically contact the inner cylindrical surface of the bearing housing 20 during rotation thereof.

Figure 3:
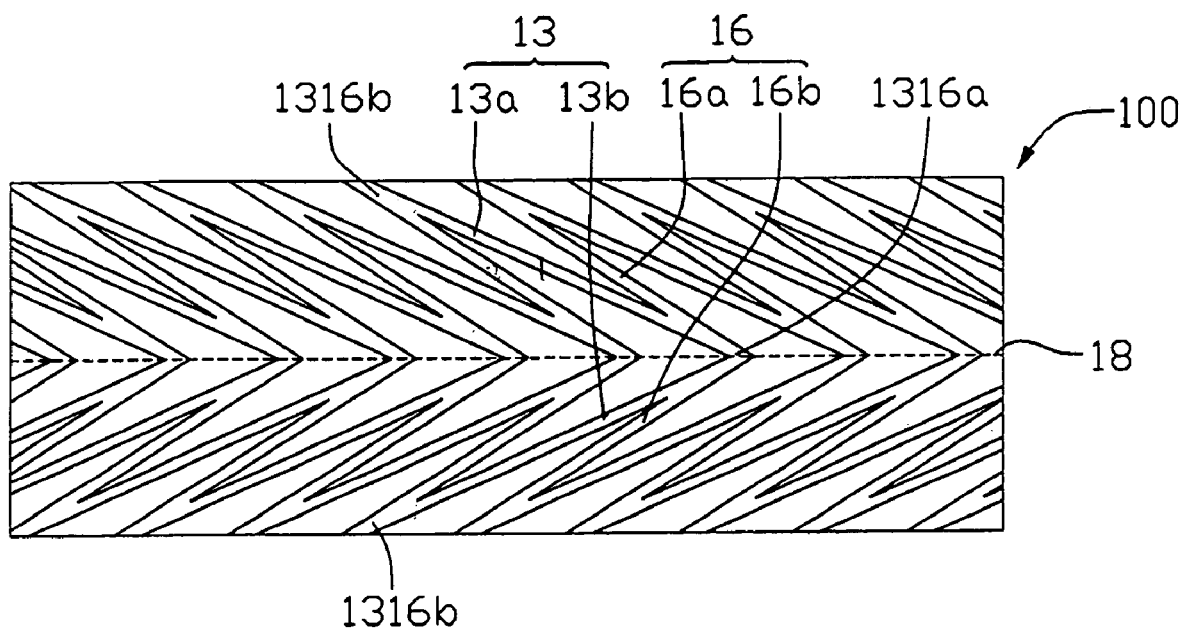
FIG. 3 is an enlarged, unfurled view of the bearing pattern of the bearing housing of FIG. 2.

Referring to FIG. 3, the cylindrical bearing pattern 100 is unfurled to a flat diagram for the sake of clarity. The bearing pattern 100 comprises an upper half and a lower half bounded by a centerline 18. A plurality of V-shaped first grooves 13 and second grooves 16 is arranged circumferentially in an alternate fashion along extension of the bearing pattern 100. Each first groove 13 has first and second branches 13a, 13b formed at the upper and lower halves of the bearing pattern 100 respectively. Each second groove 16 has first and second branches 16a, 16b formed at the upper and lower halves of the bearing pattern 100 respectively. The first and second branches 13a, 13b of each first groove 13 and the first and second branches 16a, 16b of an neighboring second groove 16 converge at a center area of the bearing pattern 100 to form an inner communication end 1316a thereat. The first and second branches 13a, 13b of each first groove 13 communicate with the first and second branches 16a, 16b of another neighboring second groove 16 at the top and bottom edges of the bearing pattern 100 to form two outer communication ends 1316b thereat respectively.

In the upper half of the bearing pattern 100, every three adjacent first branches, i.e., two first branches 13a of the first grooves 13 plus one intermediate first branch 16a of the second groove 16, or two first branches 16a of the second grooves 16 plus one intermediate first branch 13a of the first groove 13, constitute a Z-shaped groove. In the lower half of the bearing pattern 100, every three adjacent second branches, i.e., two second branches 13b of the first grooves 13 plus one intermediate first branch 16b of the second groove 16, or two second branches 16b of the second grooves 16 plus one intermediate second branch 13b of the first groove 13, constitute a Z-shaped groove. Two groups of continuous Z-shaped grooves are thereby symmetrically formed respectively at upper and lower halves of the bearing pattern 100. The two groups of Z-shaped grooves intersect at the centerline 18 of the bearing pattern 100. By this arrangement, every two adjacent grooves of the bearing pattern 100, i.e., one first groove 13 and one neighboring second groove 16, are in communication with each other, either at the inner communication ends 1316a or at the outer communication ends 1316b.

When the shaft 68 rotates, the lubricating oil at the outer communication ends 1316b is driven to the inner communication ends 1316a of the first and second grooves 13, 16 under a centrifugal pumping force caused by rotation of the shaft 68. A large amount of lubricating oil at the inner communication ends 1316a then establishes high fluid pressures to separate the rotary shaft 68 and the bearing housing 20 in radial direction.

In the present invention, the first and second branches 13a, 13b of each first groove 13 and the first and second branches 16a, 16b of one neighboring second groove 16 converge at a center area of the bearing pattern 100 to form the inner communication end 1316a thereat, and the first and second branches 13a, 13b of each first grooves 13, 16 are in communication with the first and second branches 16a, 16b of one neighboring second groove 16 at the top and bottom edges of the bearing pattern 100 to form the outer communication ends 1316b thereat respectively. The lubricating oil at each outer communication end 1316b is thus driven to two corresponding inner communication ends 1316a along two separate paths, i.e., the first or second branches 13a, 16a or 13b, 16b of the adjacent first and second grooves 13, 16. Therefore, it is easy for more lubricating oil to move to the center area of the bearing pattern 100. In other words, the lubricating oil remaining at the outer communication end 1316b becomes less in comparison with the conventional fluid bearing in which only one lubricating oil flow path is arranged. As a result, the pressure generated by the lubricating oil at the top and bottom edges of the bearing pattern 100 becomes further lower than that of the conventional fluid bearing. Suppose the top edge of the bearing pattern 100 faces an outside of the bearing housing 20, this further lower pressure provides an enhanced capability to prevent leakage of lubricating oil at the top edge of the bearing pattern 100.

Figure 4:
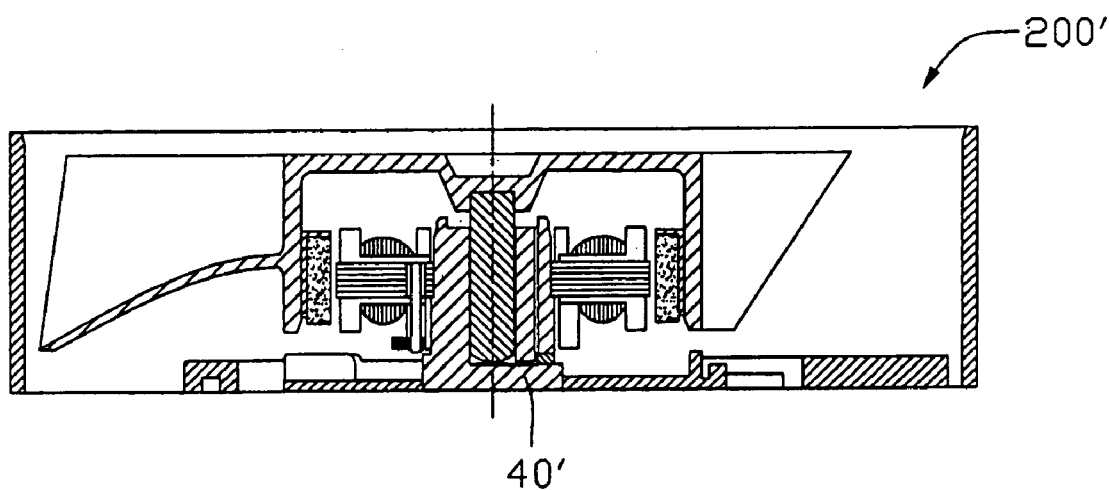
FIG. 4 is a cross sectional view of a fan according to an alternative embodiment of the present invention.
Figure 5:
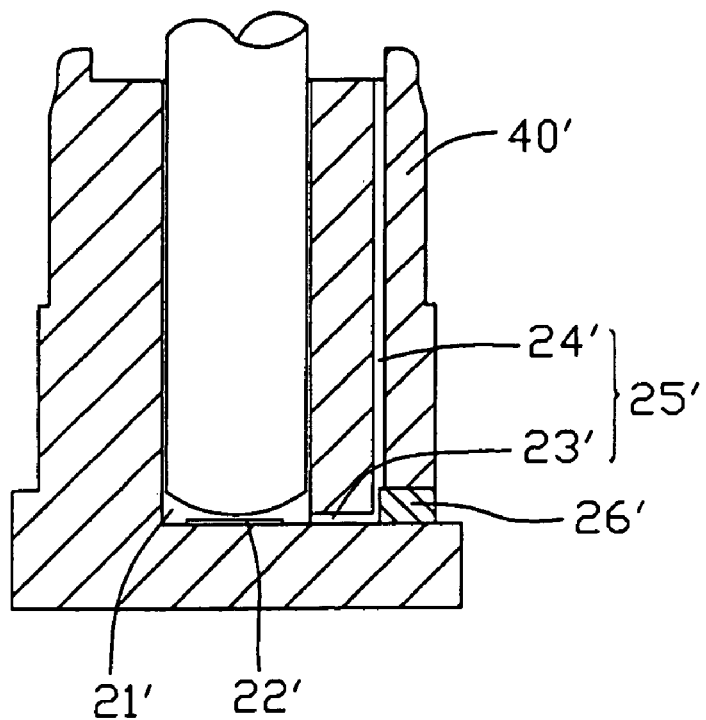
FIG. 5 is an enlarged cross section depicting the support member of the fan of FIG. 4.
Figure 6:
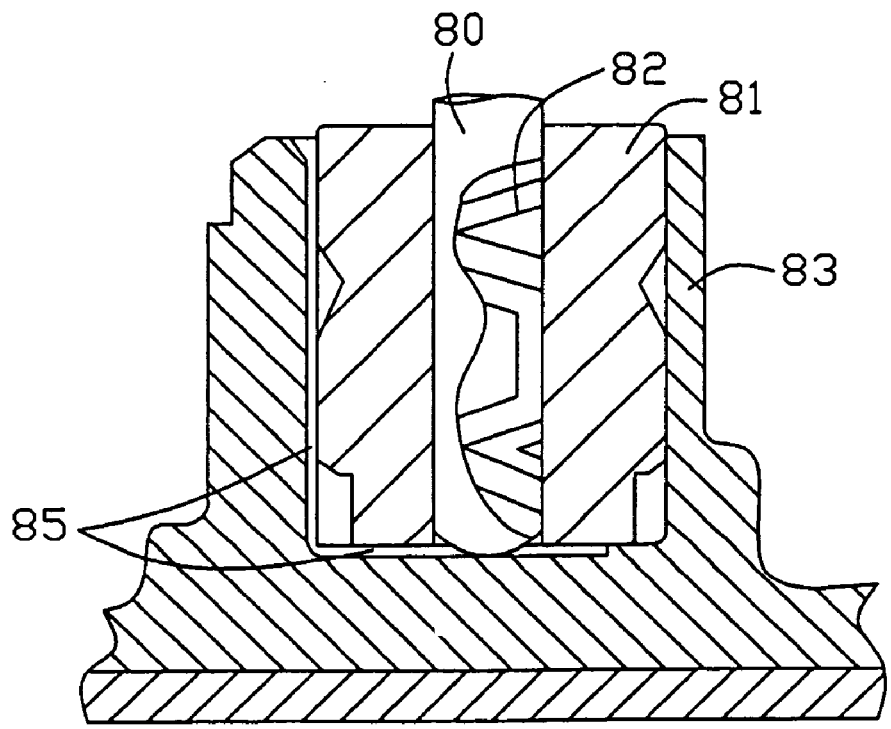
FIG. 6 is cross sectional view of a conventional motor.

FIGS. 4–5 illustrate a cooling fan 200' according to an alternative embodiment of the present invention. Except for the support member 40', other parts of the cooling fan 200' have substantially the same configuration with the cooling fan 200 of the preferred embodiment. The support member 40' in this alternative embodiment is a single body and integrated with the fan base by molding. That is, no axial tube is formed here in this alternative embodiment. Similar to the support member 40, the support member 40' has a bearing hole 21', a thrust plate 22', and a ventilating path 25' having first and second sections 23', 24', a plug 26' and bearing patterns formed on an inner surface of the support member 40'. The outer diameter of an upper section of the support member 40' is less than that of a lower section of the support member 40', so that a step 42' is formed at the outer periphery of the support member 40'. The step 42 is used for assisting axially positioning the stator assembly on the support member 40'.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A fan motor comprising:
    an integral bearing member defining therein an axial inner bearing hole and forming a ventilating path in a wall portion thereof to communicate a bottom of the bearing hole with an exterior of the bearing member, the ventilating path comprising a first section extending through the wall portion of the bearing member and communicating with the bearing hole and a second section communicating the first section with the exterior of the bearing member, and a plug disposed in an outer end of the first section;
    a stator assembly mounted to an outer periphery of the bearing member;
    a rotor assembly comprising a rotary shaft extending into the bearing hole and a permanent magnet confronting the stator assembly; and
    lubricating oil filled between the bearing member and the rotary shaft and a bearing pattern formed between the bearing member and the rotary shaft to establish dynamic pressure to separate the rotary shaft and the bearing member in radial direction when the rotary shaft rotates.

2. The fan motor as described in claim 1, wherein the first section is perpendicular to the bearing hole and the second section is parallel to the bearing hole.

3. The fan motor as described in claim 1, wherein the bearing member comprises a closed bottom side.

4. The fan motor as described in claim 3, wherein the bearing member comprises a generally U-shaped cross section.

5. A motor comprising:
    a bearing defining a hole with a closed end and a ventilating path communicating the closed end of the hole with exterior of the bearing;
    a stator directly mounted to the bearing;
    a rotor being rotatable relative to the stator and comprising a rotary shaft extending into said hole of the bearing;
    a bearing pattern being formed in at least one of said bearing and the shaft; and
    fluid received in the bearing pattern for applying pressure to the shaft when the shaft rotates in said hole;
    wherein the bearing pattern comprises a plurality of continuous pressure generating grooves communicating with each other; and
    wherein the grooves comprises a plurality of V-shaped first grooves with a central portion and two end portions away from the central portion, and V-shaped second grooves, each of the first grooves communicating with one adjacent second groove at said central portion and communicating with another adjacent second groove at end portions.

6. The motor as described in claim 5, wherein the pressure generating grooves are formed in the peripheral surface of said at least one of said bearing and the shaft.

7. A fan comprising:
    a fan frame comprising a base;
    a bearing arranged on a middle portion of the base, the bearing defining an axial inner bearing hole therein and a substantially L-shaped ventilating path in a wall portion thereof to communicate a bottom of the bearing hole with an exterior of the bearing member;
    a stator assembly mounted to an outer periphery of the bearing;
    a rotor assembly comprising a hub with a plurality of fan blades extending from the hub, a rotary shaft extending from the hub into the bearing hole with a bearing clearance and a bearing pattern formed therebetween, and a permanent magnet carried by the hub and confronting the stator assembly, wherein the bearing pattern comprises a plurality of continuous pressure generating grooves communicating with each other; and
    lubricating oil filled in the bearing clearance and the grooves to establish dynamic pressure to separate the shaft and the bearing in radial direction when the shaft rotates.

8. The fan as described in claim 7, wherein the ventilating path comprises a vertical section and a horizontal section intersecting with the vertical section and being flush with a bottom surface of the bearing hole.

9. The fan as described in claim 7, wherein the bearing and the fan base are integrally formed by molding.

10. The fan as described in claim 7, wherein the bearing comprises a step around its outer periphery to assist axially positioning the stator assembly.

11. The fan as described in claim 7, wherein the bearing hole is a blind hole.

12. The fan as described in claim 11, wherein the ventilating path comprises a vertical section and a horizontal section intersecting with the vertical section and being flush with a bottom surface of the bearing hole.

13. The fan as described in claim 11, wherein the bearing comprises a generally U-shaped cross section.

* * * * *